Nov. 11, 1969
D. W. WALKER ET AL  3,477,518
AGRICULTURAL IMPLEMENT
Filed March 28, 1966  4 Sheets-Sheet 3
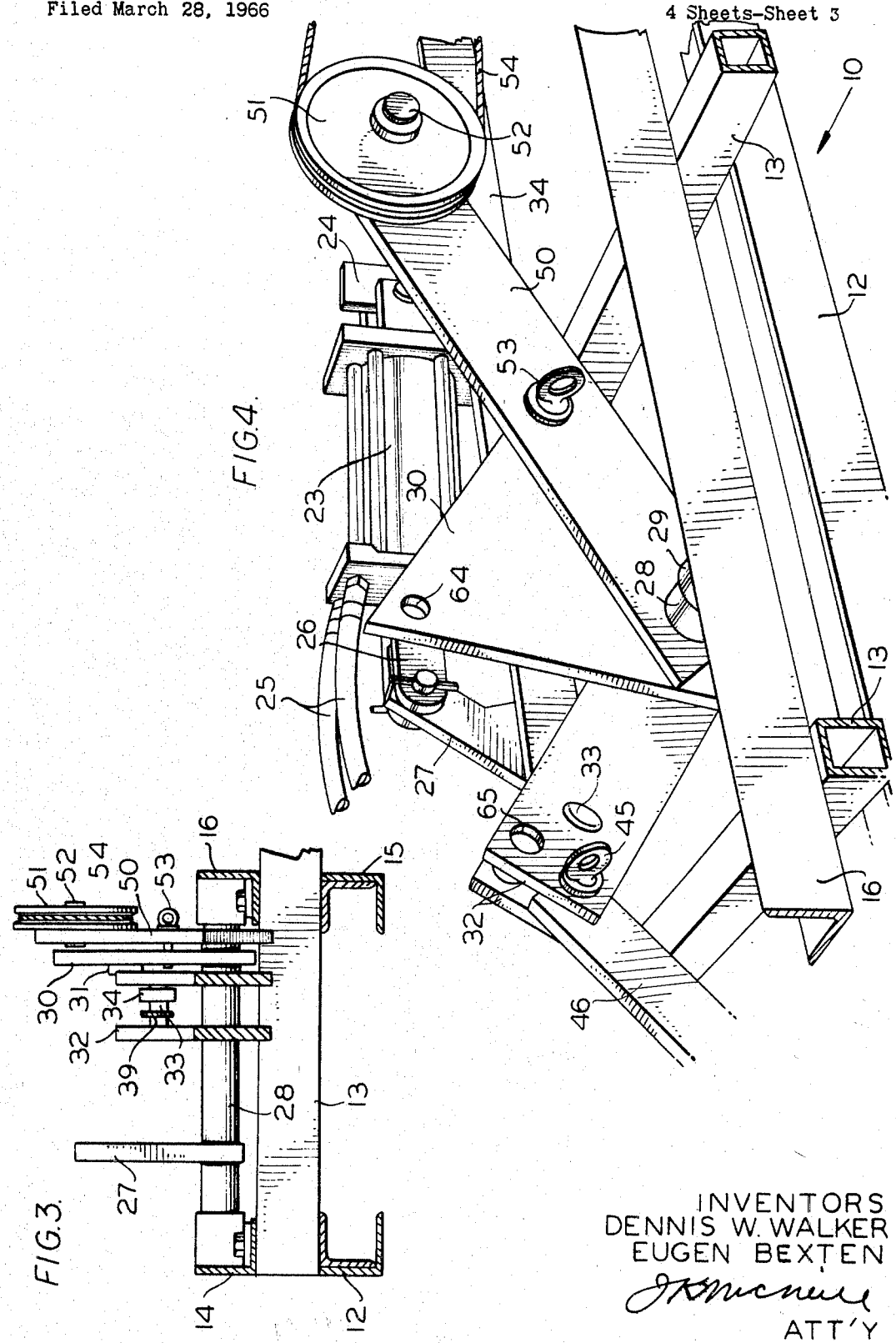
INVENTORS
DENNIS W. WALKER
EUGEN BEXTEN
ATT'Y United States Patent Office 3,477,518
Patented Nov. 11, 1969

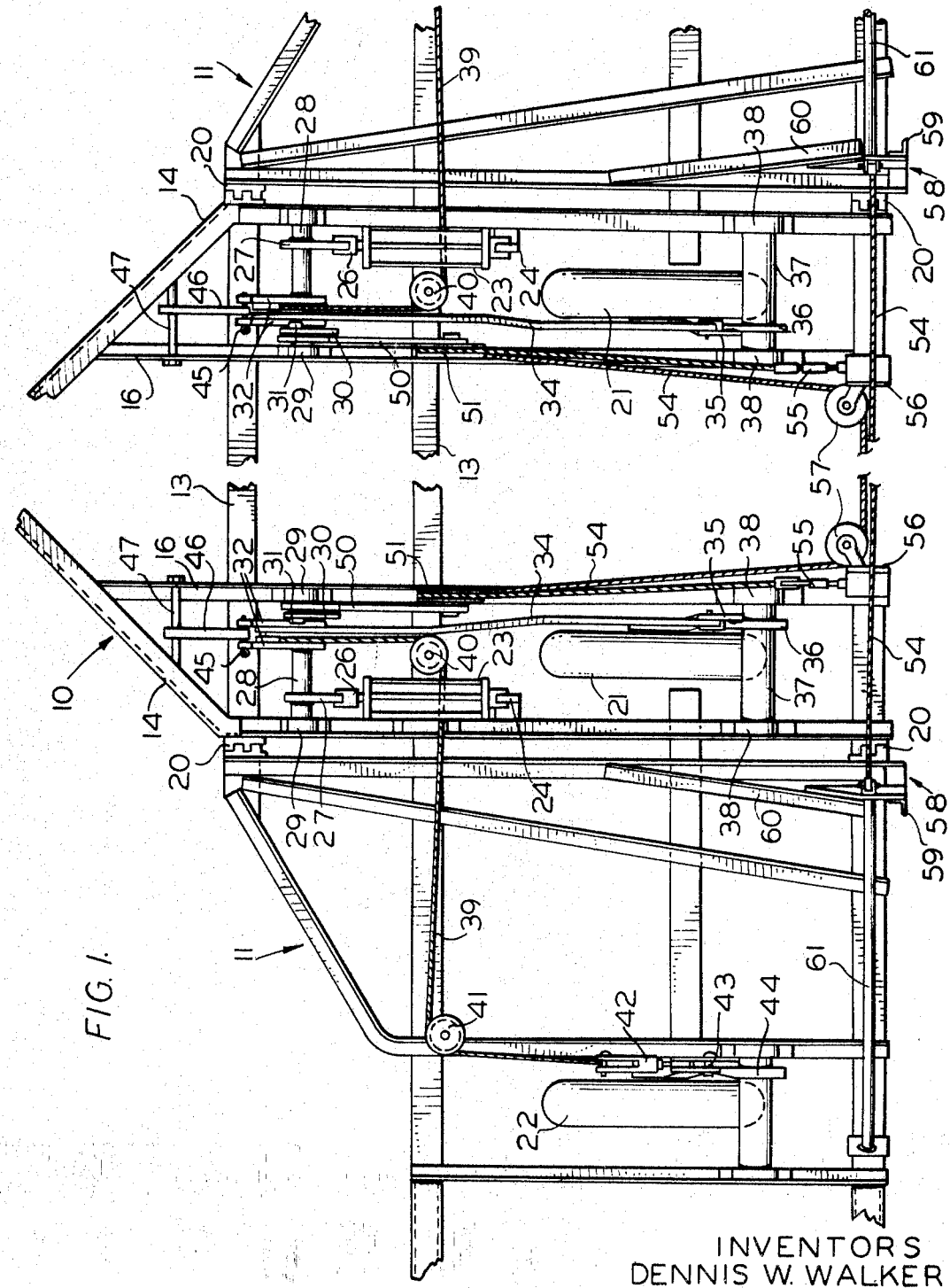

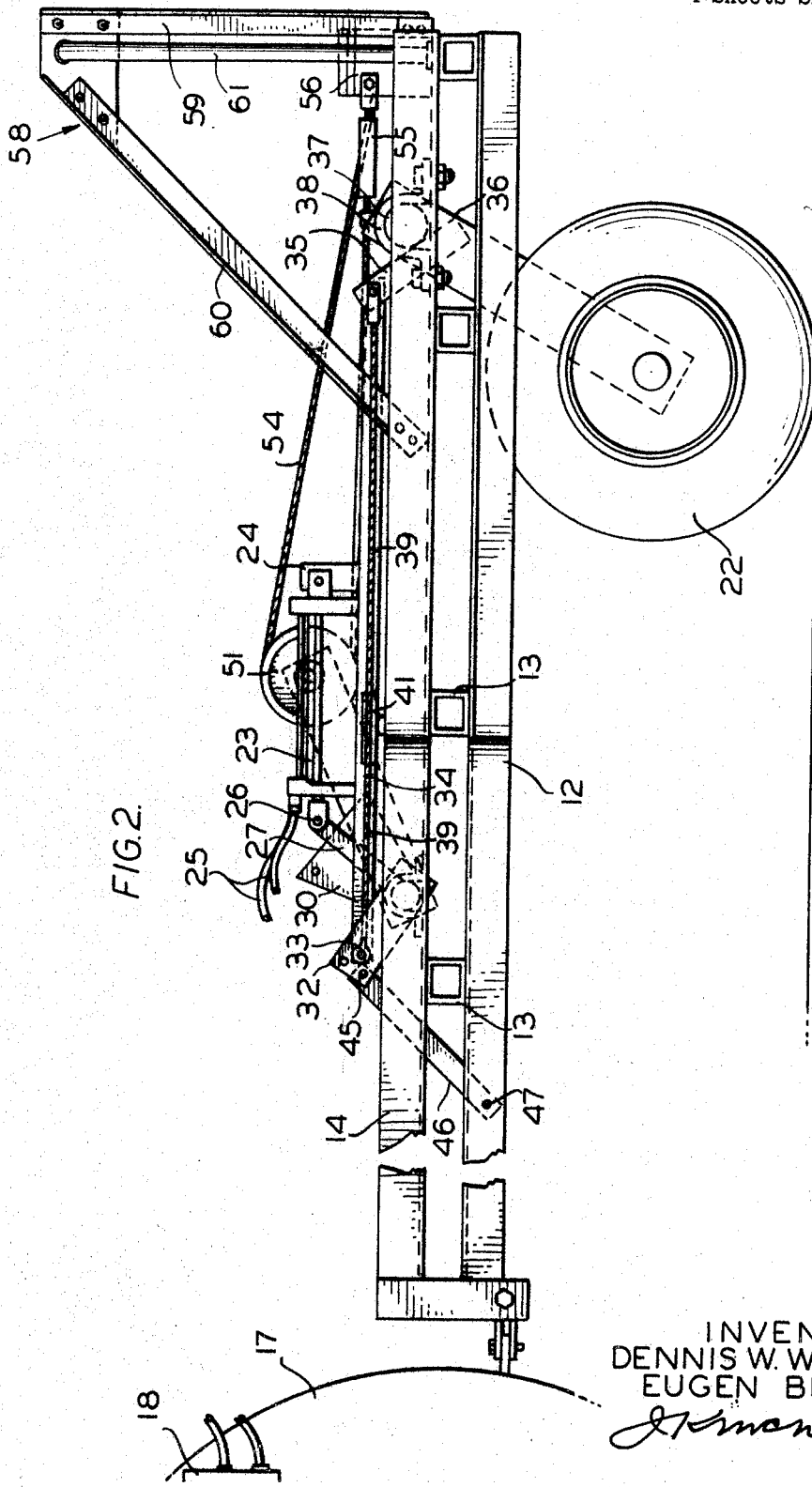

3,477,518
AGRICULTURAL IMPLEMENT
Dennis W. Walker and Eugen Bexton, Hamilton, Ontario, Canada, assignors to International Harvester Company, Chicago, Ill., a corporation of Delaware
Filed Mar. 28, 1966, Ser. No. 537,926
Int. Cl. A01b 49/00, 63/10
U.S. Cl. 172—311                               12 Claims

ABSTRACT OF THE DISCLOSURE

An agricultural implement having wing sections hinged to a main section, wheels to control penetration of the implement and provide a transportation means and power transmission means to raise and lower the wheels and wing sections.

---

This invention relates to power transmission apparatus, particularly for implements, and an object of the invention is the provision, in an implement having two or more parts to be moved, of novel power transfer means for efficiently and economically effecting the movement of such parts.

Another object of the invention is the provision, in an implement having two or more parts to be moved of means including a single hydraulic cylinder for moving both of said parts.

Other objects and advantages of the invention will become clear from the following detailed description when read in conjunction with the accompanying drawings, wherein FIGURE 1 is a plan view of a portion of an implement frame of the field cultivator type, with parts removed, having power transmission means thereon incorporating the features of this invention.

FIGURE 2 is a side elevational view on an enlarged scale of the structure shown in FIGURE 1, illustrating the manner in which the implement is connected to a tractor.

FIGURE 3 is an enlarged sectional view of a part of the power transfer mechanism of this invention.

FIGURE 4 is an enlarged perspective of a detail showing the power transmission mechanism of this invention.

Figure 5:
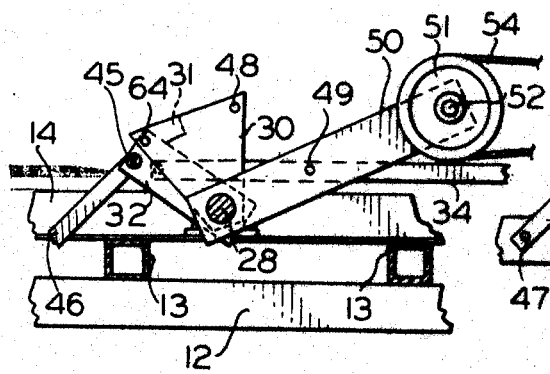
FIGURE 5 is a diagrammatic sectional view of a detail, on a small scale, with parts removed, showing the position of the parts of the power transmission mechanism when the implement has been raised on its supporting wheels.

In the drawings the numeral 10 designates the central frame section of an agricultural implement such as a field cultivator having outer left and right hand sections or wings 11 hingedly connected to the central section for swinging vertically from a horizontal operating position in alignment with the central section to a folded transport position with the wings swung upwardly about their pivots.

The main frame section 10 includes lower side bars 12 connected by transverse braces 13 and upper side rails 14, additional longitudinally extending bars 15 and upper rails 16 being also provided. The forward ends of the side bars 12 and rails 14 converge and are connected to a tractor 17 having mounted thereon a source of fluid under pressure 18.

Each laterally extending wing section 11 is connected to its side of the central frame section 10 by longitudinally spaced hinge means 20. The central section is supported by laterally spaced wheels 21, and each wing section is supported by a wheel 22, only one of which is shown.

The wing sections 11 are folded by swinging upwardly relative to the central frame section and when the wings are in lowered position the wheels 21 and 22 are vertically moved to raise and lower the implement by power transmission apparatus including left and right hand hydraulic cylinders 23 anchored to brackets 24 mounted on the central frame section 10 and supplied with fluid under pressure through hose lines 25 from the source 18 on the tractor. Cylinder 23 has a piston rod 26 slidable therein and pivotally connected to an arm 27 affixed to a shaft 28 mounted in bearings 29 carried by adjacent rails 14 and 16.

A connector plate in the form of a lever 30 is affixed, as by welding, to shaft 28 and has secured to one face thereof a stop member 31. In order to lower wheels 21 and 22 relative to the implement frame to raise the latter, piston rod 26 is extended in cylinder 23 to rock shaft 28 in a counterclockwise direction until the stop 31 engages a wheel lifting arm comprising spaced members 32 mounted on shaft 28 for rocking movement relative thereto. A pin 33 is carried between arms 32 and is connected by a lifting link 34 to a lug 35 secured to an arm 36 mounted on a shaft 37 rotatable in bearings 38 mounted on frame members 14 and 16. Arm 36 extends forwardly and downwardly from shaft 37 and wheel 21 is mounted thereon. Right and left hand power transmission mechanisms each including a hydraulic cylinder 23 and lifting link 34 are mounted on opposite sides of the central frame for raising and lowering the supporting wheels 21 for the central frame section 10.

As pointed out before, lowering of the wheels 21 and 22 with respect to the implement frame to raise and lower the latter, as between operating and transport positions, is accomplished by extension of rod 26 in cylinder 23 to rock lever 30 in a counterclockwise direction until stop 31 engages member 32 and swings it about its axis, member 32 acting through link 34 and wheel supporting arm 36 to swing the wheel 21 downwardly. Both of the wheels 21 are lowered simultaneously by operation of the associated power transmission mechanism at opposite sides of the central frame section 10.

Pin 33 serves as an anchor for a cable 39 which extends rearwardly and is trained about a pulley 40 rotatably mounted on the central frame section 10, the cable being directed laterally, trained about another pulley 41 (see FIGURE 1) rotatably mounted on the outer portion of wing section 19, and is directed rearwardly and provided at its end with a turnbuckle connector 42 anchored to a lug 43 secured to a wheel arm 44 which extends forwardly and downwardly parallel to arm 36 and carries the wheel 22 at its end. Forward rocking of arm 32, in addition to lowering wheel 21 through lift link 34, also lowers wheel 22 through cable 39 relative to the frame to raise the latter.

The raised position of the implement is shown in FIGURE 2, and when this position is reached, a pin 45 is utilized to connect arm 32 to one end of a link 46 the other end of which is connected to the implement frame by means of a bolt 47. Link 46 thus serves to lock the implement in its raised position.

Figure 7:
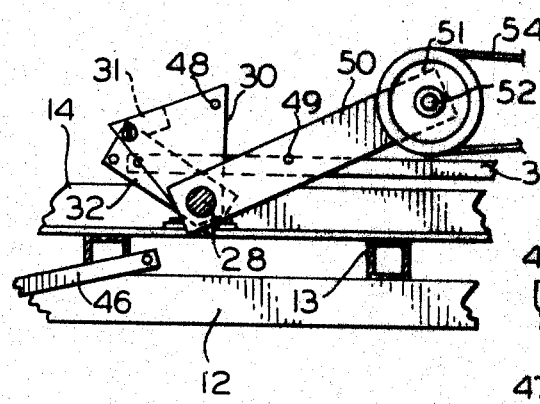
FIGURE 7 is a view similar to FIGURES 5 and 6 and shows an intermediate position of the parts before the implement has been locked in transport.

Once the operator has locked the implement in its raised or transport position with respect to the wheels 21 and 22 the cylinder 23 is ready to perform other work. Piston rod 26 is retracted and arm 27 rocked in a clockwise direction until an opening 48 (see FIGURES 5 and 7) in one corner of the triangularly shaped plate or lever 30 registers with an opening 49 in another arm 50 rockably mounted on shaft 28 and carrying at its end a pulley 51 rotatably mounted on a spindle 52.

In FIGURES 1, 4, 5, 6, 7, and 9 the power transmission parts are so disposed as to correspond to the lowered or operating position of wings 19. When the wheels have been locked in transport relative to the implement frame, and the lever 30 rocked to a position wherein openings 48 and 49 are in registry, a pin 53 is inserted to lock arm 50 to lever 30. The cylinder 23 can now be utilized by extension of the piston rod 26 therein to again rock shaft 28 and lever 30 in a counterclockwise direction.

A cable 54 is trained around pulley 51 and one end is anchored to a turnbuckle 55 connected to a plate 56 secured to the central frame section 10. The other end of cable 54 is trained around a pulley 57 also mounted on plate 56.

As is clearly shown in FIGURE 1, right and left hand pulleys 57 are mounted at laterally spaced locations on main frame section 10, and left hand cable 54, for example, is directed laterally to the right and upwardly, and is secured to the top of an upright 58 comprising a vertical post in the form of an angle bar 59, a forwardly and downwardly extending bar 60 and a brace 61 mounted on the right hand wing section 11.

Similarly, the right hand cable 54 is directed laterally to the left from right hand pulley 57 and upwardly for connection to the top of left hand upright 58 also comprising a vertical post 59, a diagonal bar 60 and a brace 61 mounted on the left hand wing section 11.

In the same way that extension of rod 26 in cylinder 23 rocks lever 30, arm 50 and pulley 51 on the left hand side of the machine, in a counterclockwise direction to cause cable 54 to swing upright 58 approximately ninety degrees inwardly to hinge the right hand wing section 19 upwardly, cylinder 23 on the right hand side of the machine operates through lever 30, arm 50 and pulley 51 on the right hand side of the machine to act through cable 54 to rock left hand upright 58 approximately ninety degrees to fold the left hand wing section 19 upwardly and inwardly. With the wheels 21 and 22 down and the left and right hand wings 19 of the machine folded upwardly, the implement is now ready to be transported.

FIGURE 5 shows the position of the power transmission parts when the wheels have been lowered to raise the frame by counterclockwise swinging of arms 32, and the latter has been locked to the frame by link 46. In this figure, arm 50 controlling one of the wing sections corresponds to the lowered or operating position of that wing section.

Figure 6:
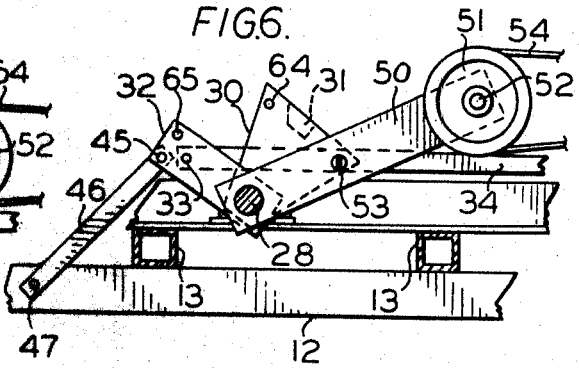
FIGURE 6 shows the parts after the implement frame has been locked in its transport position and the parts are in position to move another implement part, in this case to lift the wings of a winged implement.
Figure 8:
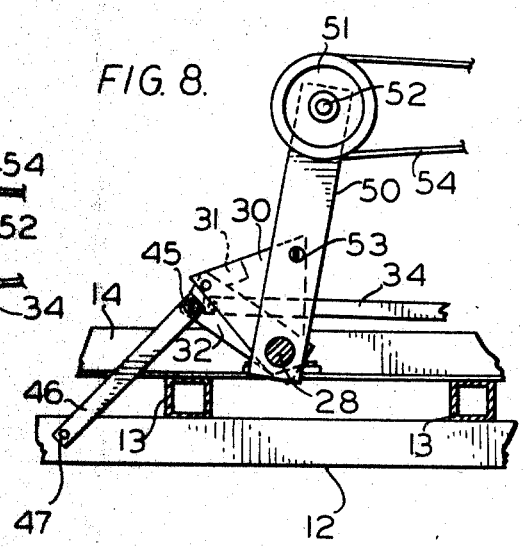
FIGURE 8 shows the position of the parts when the implement has been locked in its transport position and the wings have been lifted.
Figure 9:
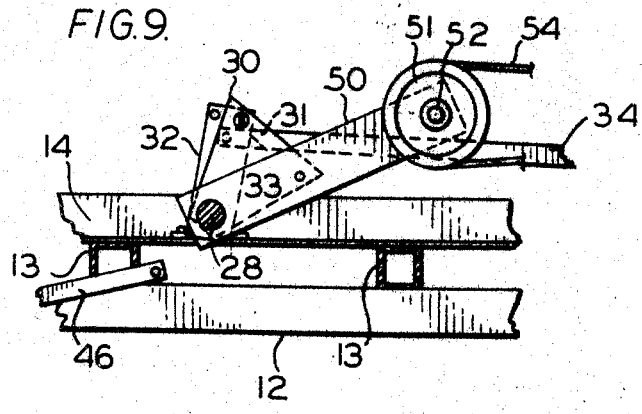
FIGURE 9 shows the arrangement of parts when the implement is being lowered to its operating position.

In FIGURE 6, with the frame elevated, lever 30 is now connected by pin 53 with arm 50 connected by cable 54 with a wing section. Lever 30 is then rocked counterclockwise, as hereinbefore explained, to raise arm 50 to the position shown in FIGURE 8. The wings 19 have now been folded and the frame is lifted and the implement is ready to be transported.

To return the implement to operation, lever 30 is rocked in a clockwise direction along with arm 50. Since the wing sections fold somewhat overcenter inwardly in their inoperative position the tractor operator manually shifts them overcenter in the opposite direction so that they are lowered by operation of the hydraulic cylinders 23, whereupon pin 53 is removed. Lever 30 is then rocked in a counterclockwise direction until stop 31 engages arm 32, whereupon pin 45 is removed from its connection with link 46 and is reinserted in registering openings 64 and 65 in lever 30 and arm 32, respectively, whereupon again rocking lever 30 clockwise lowers the frame relative to wheels 21 and 22. In this position of the power transmission parts, operation of the hydraulic cylinder 23 to rock lever 30 and arm 32 in either direction adjusts the position of wheels 21 and 22 relative to the implement frame to vary the operating depth of the implement.

What is claimed is:

1. Power transmission means for use in an earth working implement adapted to be connected to a tractor having a source of fluid under pressure and having a frame and at least two parts adapted to be moved between two positions relative to the frame, comprising a hydraulic cylinder mounted on the frame receiving fluid under pressure from said source, a lever pivoted on the frame and operatively connected to the hydraulic cylinder to be pivoted in opposite directions by operation of the cylinder, a pair of arms rockably mounted on the frame coaxially with said lever and operatively connected to the respective of said parts to move the latter upon rocking said arms, said lever being alternately swingable in opposite directions into operative association with the respective of said arms to rock the latter and move said parts.

2. Power transmission means for use in an earth working implement adapted to be connected to a tractor having a source of fluid under pressure and having a frame and at least two parts adapted to be moved between two positions relative to the frame, comprising a hydraulic cylinder mounted on the frame receiving fluid under pressure from said source, a lever pivoted on the frame and operatively connected to the hydraulic cylinder to be pivoted in opposite directions by operation of the cylinder, a pair of arms rockably mounted on the frame coaxially with said lever and operatively connected to the respective of said parts to move the latter upon rocking said arms, stop means on said lever engageable with one of said arms to move the same upon pivoting said lever in one direction, and locking means for locking said lever to the other of said arms upon pivoting said lever in the other direction.

3. The invention set forth in claim 2 wherein said arms and said lever are provided with openings registrable upon pivoting said lever in the direction of either of said arms and pin means is provided for insertion in said registering openings.

4. The invention set forth in claim 3, wherein means are provided for securing at least one of said arms to the frame upon movement of the associated parts to one of their positions.

5. The invention set forth in claim 4 wherein one of said parts comprises supporting wheels mounted on the frame and operatively connected to said one of said arms for vertical movement from an operating to a transport position of the implement in response to rocking said one of said arms in one direction and said securing means is adapted to hold said wheels and the frame in said transport position to accommodate release of said lever for pivoting in the direction of the other of said arms.

6. In an implement having a main frame, a wing section hinged to the main frame and movable from an open to a folded position, there being a first control arm rockably mounted on the main frame and connected to the wing section and rockable in one direction relative to the main frame to fold the wing section, wheels mounted on the main frame, a second control arm rockably mounted on the main frame in coaxial relationship with said first control arm mounting and connected to the wheels to vertically move them relative to the main frame to raise and lower the implement, the combination of a lever pivoted on the main frame in coaxial relationship with said first and second control arm mountings, a hydraulic cylinder mounted on the frame operatively connected to said lever for swinging the latter in opposite directions, and means for alternately connecting said lever to said first and second control arms for successively rocking the latter to fold said wing section and raise the implement.

7. The invention set forth in claim 6, wherein locking means mounted on the main frame is effective, after a predetermined rocking of said second control arm in a direction to raise the implement, to lock said second control arm to the main frame to hold the implement in its raised position independently of said hydraulic cylinder.

8. The invention set forth in claim 7, wherein the means for connecting said lever to said control arms includes a stop member on the lever engageable with one of said control arms to move same upon swinging the lever in one direction and openings in said lever and said other control arm adapted to register to receive pin means upon swinging the lever in the other direction, said lever and said control arms having other openings adapted to register, and pin means receivable therein.

9. Power transmission means for use in an earth working implement of the transversely elongated winged type adapted to be connected to a tractor to be propelled thereby, wherein said implement includes a main frame having wing sections hingedly connected to its ends for pivoting to a folded position relative to the main frame and wheels mounted on the frame for vertical swinging movement to raise and lower the implement, comprising a first arm rockably mounted on the frame operatively connected to said wheels to raise the frame upon rocking said first arm, a second arm rockably mounted on the frame in coaxial relationship with said first arm mounting and operatively connected to at least one of said wings to pivot the latter to its folded position upon rocking said arm, a lever pivotally mounted on said frame in coaxial relationship with said first and second arm mounting, a hydraulic cylinder mounted on the implement operatively connected to said lever for swinging the latter alternately in opposite directions, stop means on said lever engageable with said first arm to move the same upon pivoting the lever in one direction to swing said wheels and move the frame to its raised position, said lever being movable into operative association with said second arm upon pivoting the lever in the other direction, means for securing said first arm to the frame to hold the latter in raised position, and releasable locking means operable to lock said lever to each of said arms.

10. In an earth working implement of the transversely elongated type including a central frame section having supporting wheels vertically movably mounted thereon adapted for connection to a tractor to be propelled thereby and right and left hand wing sections having supporting wheels vertically movably mounted thereon and hingedly connected to the central section for folding to an inoperative position substantially within the lateral confines of said central section, right and left hand power transmission means mounted on said central section, means operatively connecting said right and left hand power transmission means to the wheels supporting the respective of said right and left hand wing sections and at least one of the wheels supporting said central section for vertically moving said wheels to raise and lower the implement, and means optionally and operatively connecting said right and left hand power transmission means to the respective of said left and right hand wing sections to fold the wing section of one hand by operation of the power transmission means of the other hand.

11. The invention set forth in claim 10, wherein each of said right and left hand power transmission means includes a hydraulic cylinder, a pair of arms rockably mounted on the frame and a lever rockably mounted on the frame and operatively connected to said cylinder for rocking the lever in response to operation of the cylinder, and means optionally connecting said lever to either of said arms for rocking each of said arms independently of the other.

12. The invention set forth in claim 11, wherein one of said arms of the power transmission means of one hand is operatively connected to the wing section of the opposite hand, whereby the right hand wing section is folded by operation of the left hand power transmission means and the left hand wing section is folded by operation of the right hand power transmission means.

References Cited

UNITED STATES PATENTS

| | | | |
|---|---|---|---|
| 3,354,966 | 11/1967 | Jackson | 172—311 |
| 3,362,483 | 1/1968 | Twidale | 172—311 |

ROBERT E. BAGWILL, Primary Examiner

S. C. PELLEGRINO, Assistant Examiner

U.S. Cl. X.R.

172—456, 466, 469